Nov. 13, 1934.   H. J. WOOCK   1,980,565
METHOD OF SECURING A REENFORCING LINER IN A TIRE
Filed March 20, 1933
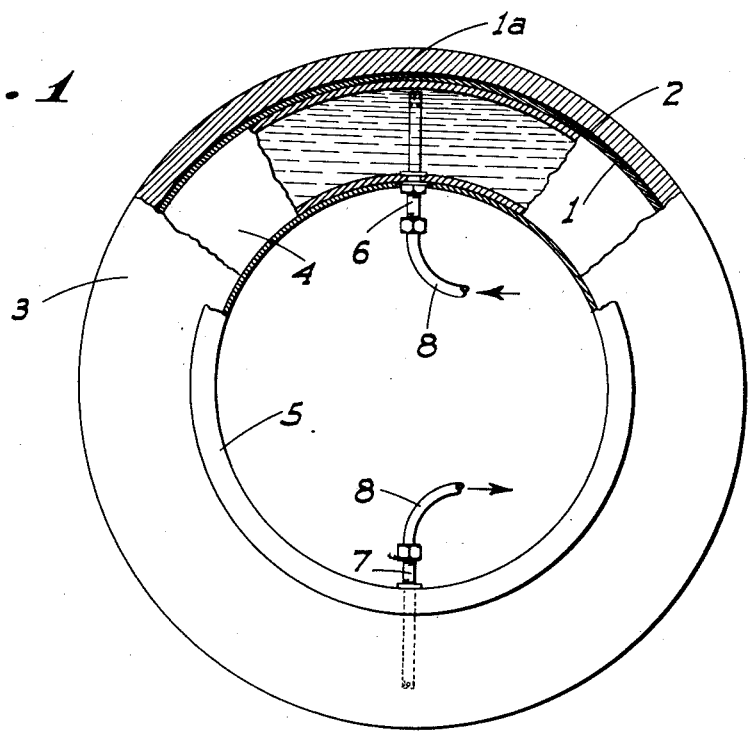
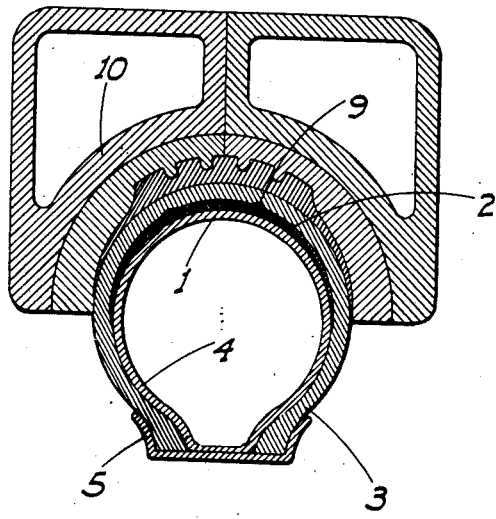
INVENTOR
H. J. Woock
BY
ATTORNEY Patented Nov. 13, 1934

1,980,565

UNITED STATES PATENT OFFICE 1,980,565

METHOD OF SECURING A REENFORCING LINER IN A TIRE

Herbert J. Woock, Lodi, Calif., assignor to Super Mold Corporation, Lodi, Calif., a corporation of Nevada Application March 20, 1933, Serial No. 661,684

1 Claim. (Cl. 154—14)

This invention relates to tire repairing or reconditioning and is particularly valuable in connection with large tires such as are used on trucks and busses, though not necessarily restricted to such use.

The art of retreading tires as heretofore practiced comprises in general the removal of the remnants of old rubber left on the tread of a worn tire and the rebuilding of a tread of new unvulcanized rubber on the carcass and then vulcanizing this rubber in place. Thus if the old carcass is in good repair a renewed life is given to the tire and in many instances tires as thus retreaded will be useful in service as long or longer than even a new tire, since if the retreaded tire is put into early service after retreading, as is usually the case, its tread rubber is fresher and more pliant than that on new tires which may have become shopworn before going into service.

It will be noted that I have stated above that this renewed usefulness is dependent in a great measure on the carcass of the rebuilt tire being in good condition. If this is not true the useful life of a retreaded tire may be shortened by the collapse of a defective carcass although the new tread may still be in good condition. It sometimes happens that the carcass of the tire has been stretched or weakened from various causes while in original service which condition is not directly apparent from inspection, but when retreaded and put back into service may cause untimely collapse. This is especially true in connection with large truck or bus tires and in a lesser degree to tires built to carry lesser loads.

It is therefore the principal object of this invention to avoid the above objectionable features by preparing a special inner reenforcing liner and a method of securing the same in the tire in such a manner that the liner practically forms an integral part of the tire and in such a manner as to effectively reenforce and strengthen the weakened carcass and give to the final rebuilt tire with its excellent new tread a carcass with strength equal to or better than the carcass when it was new.

Another, and important, object of the invention is to provide a method whereby the reenforcing and strengthening inner liner may be most effectively inserted into the tire and vulcanized into a permanent component part thereof with assurance that no air pockets will be left between the liner and the tire and so that the liner when the tire is in use will not chaff nor injure the inner tube used in the tire.

Another object is to so provide the method of inserting the liner into the tire that it may be either separately vulcanized in place or conjointly with the new tread. Thus a liner may be inserted and vulcanized in place even in a tire which does not need retreading but in which the carcass has become weakened, as well as in tires where retreading is also to be carried out. When both tread and liner are vulcanized onto the tire at one time the only additional time and cost of adding the liner is that involved in the initial preparation and insertion of the liner ready for vulcanization.

The accompanying drawing illustrates the liner vulcanizing method, both when performed alone, and when carried out in connection with the vulcanizing of a retread on the tire.

In the drawing Fig. 1 is a side view, partly in section, of a tire mounted on a rim, with a liner therein being vulcanized in place.

Fig. 2 is a cross section of the tire after being lined and retreaded, and inserted in a vulcanizing mold to vulcanize the retread and liner simultaneously.

Referring now more particularly to the characters of reference on the drawing, the first step in the method consists in making up the special liner. This liner consists of a strip 1 of a tough single ply or laminated fabric of suitable character, smooth on one side and of a width sufficient to extend across the internal tread zone of the tire and down the side walls of the same a certain distance.

While the strip may be made of new material especially designed or prepared for the purpose, a convenient and economical way to obtain the same is to utilize the inner cord layers of an old tire in good condition; retaining the smooth inner surface layer of the tire carcass which then occupies the same inner position when used as a liner in another tire. The strip is skived on its relatively rough side so that it is feather edged, both along the sides and ends, so that when placed in a tire it will merge into the side walls of the same without any abrupt shoulders or sharp cornered ledges being formed, and the ends may also be smoothly overlapped as shown at 1a. This liner as so prepared may be made in one piece or in two or more pieces as may be found convenient.

Before being inserted in the tire a layer of unvulcanized rubber 2 is applied to the rough side of the fabric strip. This is preferably done by means of the machine shown in my copending application for patent, Serial No. 661,686, filed Mar. 20, 1933. As a substitute for the rubber thus applied it may be found practical in some cases to merely coat the liner with a relatively thick layer of rubber cement or other vulcanizable rubber composition.

The liner being thus prepared the next step is to prepare the tire to receive it. Such tire is first thoroughly buffed on the inside to remove all soapstone from and to clean and roughen the fabric forming the inner surface of the tire.

The interior periphery of the tire is then measured. The liner is then cut to such length that when its skived ends are overlapped it will be substantially the exact length of the inner periphery of the tire so as to fit accurately therein.

The liner is then inserted in place in the tire with the rubber coating interposed between the liner fabric and the inner fabric surface of the tire. This insertion may be carried out by hand or such mechanism as may be found adaptable.

The liner having been thus placed in the tire the next important step is to force it permanently to place, and expel all air from between it and the body of the tire. This I accomplish by placing an air bag, such as an inner tube within the tire and then placing the tire upon the proper sized rim. Air pressure is then admitted to the bag. Thus equal pressure is applied to the liner over its entire peripheral area. This forces it to place against the inner surface of the tire and expels all air pockets the presence of which would tend to prevent proper vulcanization of the rubber to the tire fabric.

If desired in connection with the application of the air pressure the tire may be mounted for rotation in contact with a roll and pressed against the same so that the contacting area of the tire is flattened, as for instance as shown in my copending application for patent, Serial No. 615,641, filed June 6, 1932. Due to the flattening of the tire against the roll and to the interior pressure due to the bag inside the tire, the rubber of the liner, especially over the tread zone, is pressed into the roughened fabric surface of the tire and thus increases its tendency to adhere very firmly to the inner surface of the same.

The liner having been thus properly prepared and set in position in the tire it remains only to vulcanize it in place. Success in so vulcanizing it that it will become a true component part of the tire as a whole depends upon its being vulcanized uniformly over its entire area at the same time and to the same degree. To accomplish this uniform vulcanization I preferably insert therein a fluid pressure bag 4 and the tire is then mounted on a suitable supporting rim 5. The pressure bag 4 is of a special nature being provided with opposed intake and outlet nipples 6 and 7. These are connected to the proper circulating pipes 8 of a hot water pressure circulating system such as that shown in my copending application for patent, Serial No. 531,739, filed April 21, 1931. Due to the heat from the hot water and the pressure thereof the rubber of the liner is efficiently vulcanized both to the tire and to the fabric of the liner itself.

It is to be noted that this pressure and heat are applied over the entire area of the liner evenly and simultaneously and from the interior of the tire, or immediately adjacent the liner where such heat and pressure are most effective. Prior to the insertion of the bag 4, the interior surface of the liner and tire is painted over with a soapstone solution to prevent possibility of any of the rubber on the liner adhering or being vulcanized to the bag 4.

It may in some instances be found feasible to depend on the pressure of the bag 4 to force the tire to place and eliminate the air pockets instead of performing this operation with the separate air bag above referred to. This would be particularly true if the vulcanizing step could be carried out immediately upon the liner being first inserted in place in the tire.

If the liner is mounted in a tire which is also just about to be retreaded, the necessary vulcanizing of the retreading rubber in the mold 10 may be carried out simultaneously with the vulcanizing of the liner therein and by the use of the same heat and pressure bag 4 as shown in Fig. 2. These two necessary steps in the reconditioning of a worn tire may therefore be carried out at one operation, thus saving time, labor and operating expenses since the pressure bag is inserted and used but once for both purposes.

While I have disclosed the preferred method of applying the rubber or rubber cement to the fabric liner it may possibly be found in practice that the rubber could be placed first on the inner surface of the tire and the fabric of the liner placed over the same. Either procedure would be within the scope of my invention. Wherever I have used the term "unvulcanized rubber" herein it is to be understood that the same refers to any rubber composition found adaptable to the purposes of the invention.

While the prime function of the liner is to reenforce and strengthen stretched or weakened tire carcasses it will also be found in practice that the rubber on the inner face of the liner will tend to fill into and heal minor cuts and pin or nail holes extending through the fabric and in this way further tend to rehabilitate the tire for a renewed life.

From the foregoing description it will be readily seen that I have produced such a method as substantially fulfills the objects of the invention as set forth herein.

Having thus described my invention what I claim as new and useful and desire to secure by Letters Patent is:

The method of sealing the inner surface of a tire comprising inserting therein a liner faced on one side with unvulcanized rubber, distorting the tread portion of the tire from the outside to substantially flatten the same and thus spread any crevices or holes opening to the interior of the tire and concurrently applying pressure against the liner from the interior of the tire to cause the liner rubber to be pressed into and seal such crevices, and then vulcanizing the rubber.

HERBERT J. WOOCK.